United States Patent
Saito et al.

(10) Patent No.: US 12,326,180 B2
(45) Date of Patent: Jun. 10, 2025

(54) SPEED REDUCING OR INCREASING APPARATUS

(71) Applicant: THK CO., LTD., Tokyo (JP)

(72) Inventors: Hideo Saito, Tokyo (JP); Kotaro Kushida, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 18/554,351

(22) PCT Filed: Mar. 30, 2022

(86) PCT No.: PCT/JP2022/016120
§ 371 (c)(1),
(2) Date: Oct. 6, 2023

(87) PCT Pub. No.: WO2022/220128
PCT Pub. Date: Oct. 20, 2022

(65) Prior Publication Data
US 2024/0191778 A1    Jun. 13, 2024

(30) Foreign Application Priority Data
Apr. 13, 2021   (JP) .................................. 2021-067556

(51) Int. Cl.
*F16H 1/32*      (2006.01)
(52) U.S. Cl.
CPC ................................... *F16H 1/321* (2013.01)
(58) Field of Classification Search
CPC ...... F16H 57/0025; F16H 57/021; F16H 1/32; F16H 1/321
See application file for complete search history.

(56) References Cited

U.S. PATENT DOCUMENTS

| 3,385,135 A | 5/1968 | Lennart |
| 2018/0045280 A1* | 2/2018 | Saito ....................... F16H 53/02 |
| 2021/0140489 A1 | 5/2021 | Saito et al. |

FOREIGN PATENT DOCUMENTS

| DE | 2162867 A1 | 7/1972 |
| DE | 112018003972 T5 | 4/2020 |
| GB | 2134208 A | 8/1984 |

(Continued)

OTHER PUBLICATIONS

International Search Report for PCT/JP2022/016120 mailed May 17, 2022, 4 pages.

(Continued)

*Primary Examiner* — Lori Wu
(74) *Attorney, Agent, or Firm* — NIXON & VANDERHYE

(57) ABSTRACT

A speed reducing apparatus is provided which can prevent nonuniformity from occurring in output torque. A speed reducing apparatus that causes a first face gear to incline in such a manner as to mesh with a second face gear and causes the first face gear to oscillate in such a manner as to move a meshing portion in a circumferential direction includes a ball spline portion that supports the first face gear in an inclinable manner. The ball spline portion includes an outer ring, an inner ring, a ball capable of rolling along a ball groove of the outer ring and a ball groove of the inner ring, and a cage having a pocket in which the ball is incorporated, and allows axial displacement of the first face gear.

17 Claims, 13 Drawing Sheets

(56) References Cited

FOREIGN PATENT DOCUMENTS

| | | | |
|---|---|---|---|
| JP | S51126467 | A | 11/1976 |
| JP | S541853 | B1 | 1/1979 |
| JP | S5715140 | A | 1/1982 |
| JP | 2001349387 | A | 12/2001 |
| JP | 2016176568 | A * | 10/2016 |
| WO | WO-2021156149 | A1 * | 8/2021 |

OTHER PUBLICATIONS

Written Opinion of the ISA for PCT/JP2022/016120 mailed May 17, 2022, 4 pages.
Search Report, issued in European Patent Application No. 22788053.1 dated Feb. 5, 2025.

* cited by examiner

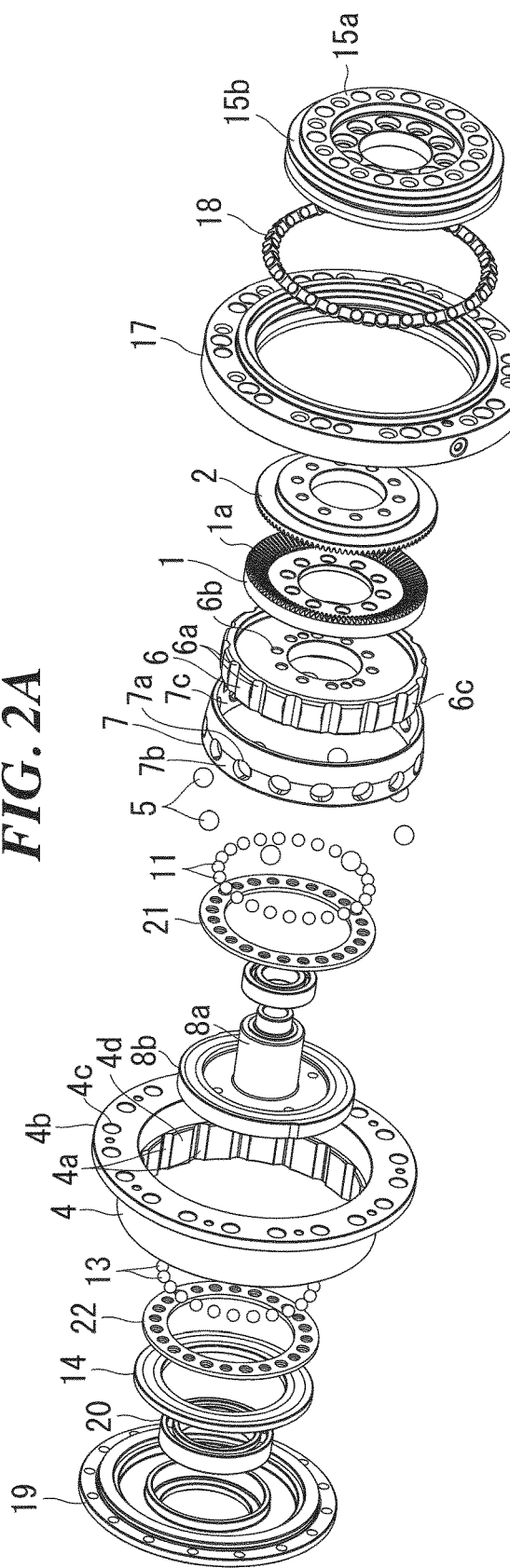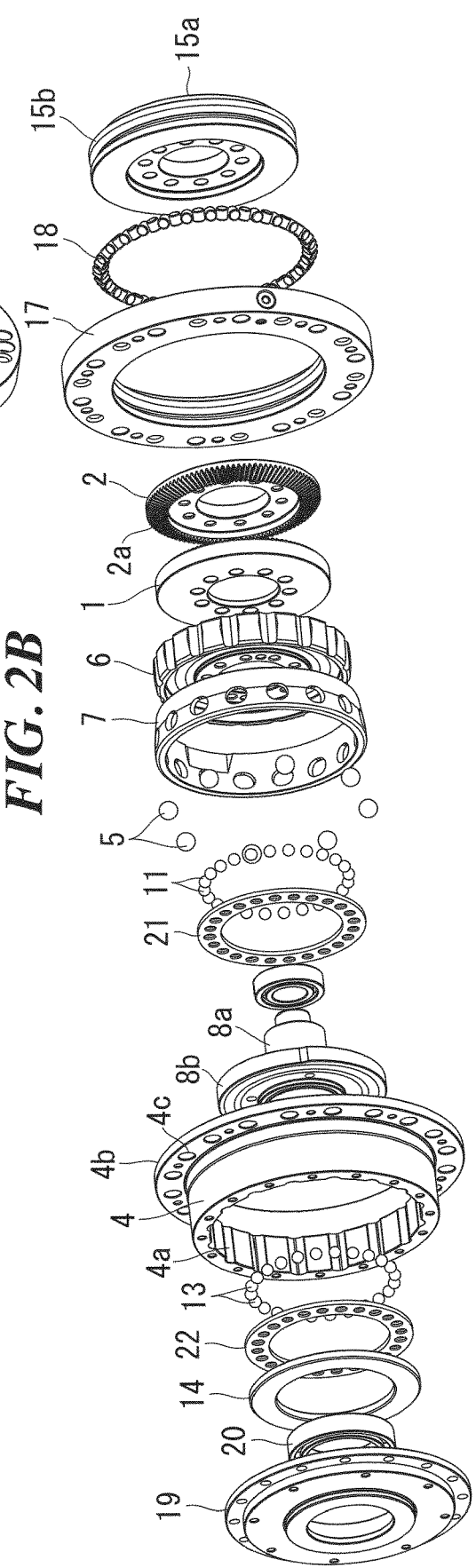

SPEED REDUCING OR INCREASING APPARATUS

This application is the U.S. national phase of International Application No. PCT/JP2022/016120 filed Mar. 30, 2022, which designated the U.S. and claims priority to JP Patent Application No. 2021-067556 filed Apr. 13, 2021, the entire contents of each of which are hereby incorporated by reference.

TECHNICAL FIELD

The present invention relates to a speed reducing or increasing apparatus.

BACKGROUND ART

As this type of speed reducing apparatus, a speed reducing apparatus described in Patent Literature 1 or Patent Literature 2 is known. This speed reducing apparatus causes a first face gear to incline in such a manner as to mesh with a second face gear, and causes the first face gear to oscillate in such a manner as to move a meshing portion in the circumferential direction (the oscillation of the first face gear is also called precession).

In the speed reducing apparatus described in Patent Literature 1, the first face gear is coupled to an input shaft. The second face gear is coupled to an output shaft. The first face gear is supported by a spline portion in such a manner as to be capable of oscillating, and the rotation of the first face gear is restricted by the spline portion. When the input shaft is rotated, the first face gear oscillates, the second face gear decelerates by a difference in the number of teeth from the first face gear and rotates, and the rotation of the second face gear at the decreased rotational speed is taken to the output shaft (refer to FIG. 1 of Patent Literature 1).

In the speed reducing apparatus described in Patent Literature 2, the first face gear is coupled to an input shaft. The second face gear is fixed to a housing. The first face gear is supported by a spline portion provided on an output shaft in such a manner as to be capable of oscillating. When the input shaft is rotated, the first face gear oscillates, the first face gear decelerates by a difference in the number of teeth from the second face gear and rotates, and the rotation of the first face gear at the decreased rotational speed is taken to the output shaft via the spline portion (refer to FIG. 8 of Patent Literature 2).

CITATION LIST

Patent Literature

Patent Literature 1: JP S57-15140 A
Patent Literature 2: JP S51-126467 A

SUMMARY OF INVENTION

Technical Problem

However, the speed reducing apparatuses described in Patent Literature 1 and Patent Literature 2 have a problem that the first face gear and the second face gear cannot stay meshed with each other due to machining errors in and wearing out of the first face gear and the second face gear, therefore nonuniformity occurs in output torque.

A first aspect of the invention has been made in view of the above problem, and a first object thereof is to provide a speed reducing or increasing apparatus that prevent nonuniformity from occurring in output torque.

This type of speed reducing apparatus is desired to be incorporated into a small space such as a joint structure of a robot.

A second aspect of the invention has been made in view of the above problem, and a second object thereof is to provide a speed reducing or increasing apparatus that can be downsized.

Moreover, in the known speed reducing apparatuses, the first face gear and an inner ring of the spline portion are separate from each other, and are coupled by use of a fastening member. Hence, coaxial accuracy between the first face gear and the inner ring of the spline portion may be reduced. In this case, it is not possible to cause the first face gear to accurately undergo precession.

A third aspect of the invention has been made in view of the above problem, and a third object thereof is to provide a speed reducing or increasing apparatus that can increase the coaxial accuracy between the first face gear and the inner ring of the spline portion.

Solution to Problem

In order to solve the first problem above, the first aspect of the invention is a speed reducing or increasing apparatus that causes a first face gear to incline in such a manner as to mesh with a second face gear and causes the first face gear to oscillate in such a manner as to move a meshing portion in a circumferential direction, the speed reducing or increasing apparatus including: a ball spline portion supporting the first face gear in an inclinable manner, in which the ball spline portion includes an outer ring, an inner ring, a ball capable of rolling along a ball groove of the outer ring and a ball groove of the inner ring, and a cage having a pocket in which the ball is incorporated, and allows axial displacement of the first face gear.

In order to solve the second problem above, the second aspect of the invention is a speed reducing or increasing apparatus that causes a first face gear to incline in such a manner as to mesh with a second face gear and causes the first face gear to oscillate in such a manner as to move a meshing portion in a circumferential direction, the speed reducing or increasing apparatus including: a ball spline portion supporting the first face gear in an inclinable manner to transmit rotation of the first face gear to an output portion; and a bearing portion rotatably supporting the output portion, in which the ball spline portion includes an outer ring, an inner ring, and a ball capable of rolling along a ball groove of the outer ring and a ball groove of the inner ring, the bearing portion includes an outer ring having an inner surface in which a rolling element groove extending in the circumferential direction is formed, an inner ring having an outer surface in which a rolling element groove extending in the circumferential direction is formed, and a rolling element capable of rolling along the rolling element groove of the outer ring and the rolling element groove of the inner ring, and the outer ring of the ball spline portion is formed integrally with the inner ring of the bearing portion.

In order to solve the third problem above, the third aspect of the invention is a speed reducing or increasing apparatus that causes a first face gear to incline in such a manner as to mesh with a second face gear and causes the first face gear to oscillate in such a manner as to move a meshing portion in a circumferential direction, the speed reducing or increasing apparatus including: a ball spline portion supporting the first face gear in an inclinable manner, in which the ball spline portion includes an outer ring, an inner ring, balls capable of rolling along ball grooves of the outer ring and ball grooves of the inner ring, and a cage having pockets in which the balls are incorporated, and the first face gear is formed integrally with the inner ring of the ball spline portion.

Advantageous Effects of Invention

According to the first aspect of the invention, the ball spline portion allows the axial displacement of the first face gear; therefore, even if there are machining errors in and wearing out of the first face gear and the second face gear, the first face gear and the second face gear can stay meshed with each other, and it is possible to prevent nonuniformity from occurring in output torque.

According to the second aspect of the invention, the outer ring of the ball spline portion is formed integrally with the inner ring of the bearing portion; therefore, the speed reducing or increasing apparatus can be downsized.

According to the third aspect of the invention, the coaxial accuracy between the first face gear and the inner ring of the ball spline portion can be increased.

BRIEF DESCRIPTION OF DRAWINGS

FIGS. 2A and 2B are exploded perspective views of the speed reducing apparatus of the first embodiment of the present invention (FIG. 2A is a perspective view as viewed from an output portion, and FIG. 2B is a perspective view as viewed from an input portion).

DESCRIPTION OF EMBODIMENTS

Embodiments of a speed reducing apparatus of the present invention are described hereinafter with reference to the accompanying drawings. However, the speed reducing apparatus of the present invention can be embodied in various forms and is not limited to the embodiments described in the description. The embodiments are provided with the intention of enabling those skilled in the art to fully understand the invention by fully disclosing the description.

First Embodiment

Figure 1:
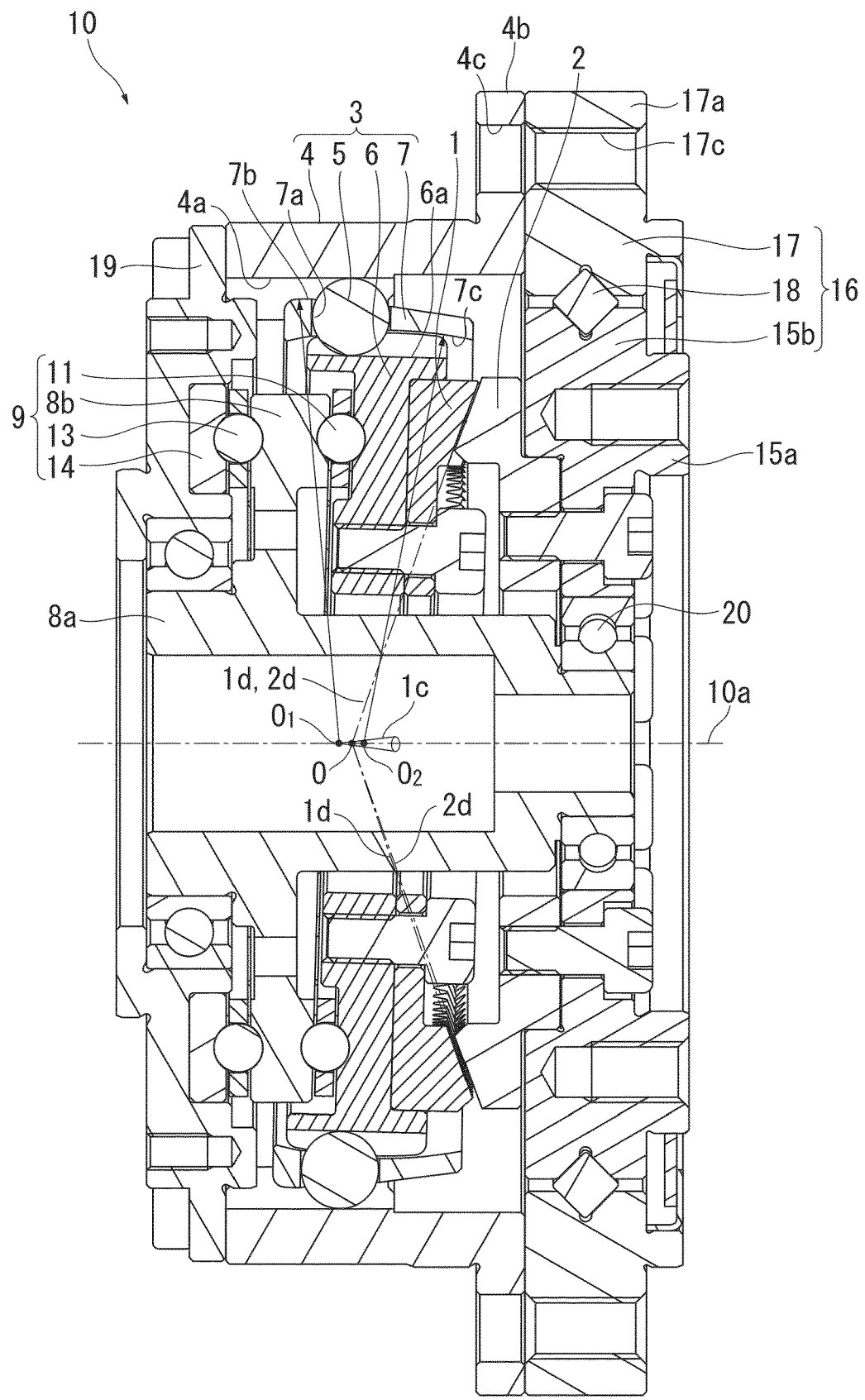
FIG. 1 is a cross-sectional view taken along an axis of a speed reducing apparatus of a first embodiment of the present invention.

FIG. 1 is a cross-sectional view of a speed reducing apparatus 10 of a first embodiment of the present invention. A reference sign 1 denotes a first face gear, a reference sign 2 denotes a second face gear, and a reference sign 3 denotes a ball spline portion that supports the first face gear 1 in an inclinable manner.

A reference sign 8a denotes an input portion, a reference sign 9 denotes a motion conversion portion that converts the rotational motion of the input portion 8a into oscillation (hereinafter referred to as precession) of the first face gear 1, and a reference e sign 15a denotes an output portion. Precession is the motion of an axis 1c of the first face gear 1 that draws a conic surface with a joint center O (an intersection of a plane including centers of a plurality of balls 5 of the ball spline portion 3 and an axis 10a of the speed reducing apparatus 10) of the ball spline portion 3 as an apex. In the first embodiment, the ball spline portion 3 allows the first face gear 1 to undergo precession, and restricts the rotation of the first face gear 1 about the axis 10a of the speed reducing apparatus 10. When the input portion 8a is rotated, the first face gear 1 undergoes precession, and the second face gear 2 decelerates by a difference in the number of teeth from the first face gear 1 and rotates. The rotation of the second face gear 2 at the decreased rotational speed is taken to the output portion 15a.

Let the number of teeth of the first face gear 1 be $Z_1$, and let the number of teeth of the second face gear 2 be $Z_2$. A speed reducing ratio A of the speed reducing apparatus 10 is expressed by the following equation:

$$A=(Z_1-Z_2)/Z_2$$

The configuration of each portion of the speed reducing apparatus 10 is described below also with reference to exploded perspective views of FIGS. 2A and 2B. FIG. 2A is an exploded perspective view as viewed from the output portion 15a, and FIG. 2B is an exploded perspective view as viewed from the input portion 8a.

As illustrated in FIG. 2A, the first face gear 1 is formed in an annular shape. A plurality of teeth 1a is formed radially on a surface, which faces the second face gear 2, of the first face gear 1. As illustrated in FIG. 1, the apex of a conic surface 1d on which the tooth traces of the first face gear 1 extend coincides with the joint center O of the ball spline portion 3.

As illustrated in FIG. 2B, the second face gear 2 is also formed in an annular shape. A plurality of teeth 2a is formed radially on a surface, which faces the first face gear 1, of the second face gear 2. The number of teeth of the second face gear 2 is different from the number of teeth of the first face gear 1. As illustrated in FIG. 1, the apex of a conic surface 2d on which the tooth traces of the second face gear 2 extend coincides with the joint center O of the ball spline portion 3.

As illustrated in FIG. 1, the ball spline portion 3 allows angular displacement of the first face gear 1 and allows displacement of the first face gear 1 in the axial direction (the direction of the axis 10a of the speed reducing apparatus 10). The ball spline portion 3 includes an outer ring 4, an inner ring 6, the balls 5 that can roll along ball grooves 4a of the outer ring 4 and ball grooves 6a of the inner ring 6, and a cage 7 having pockets 7a in which the balls 5 are incorporated.

The outer ring 4 has a cylindrical shape and is formed integrally with a housing. The outer ring 4 is formed integrally with a flange 4b having a through-hole 4c for fastening to an outer ring 17 of a bearing portion 16. A plurality of the ball grooves 4a (refer to FIG. 2A) extending in the axial direction is formed in a cylindrical inner surface 4d (refer to FIG. 2A) of the outer ring 4. The ball grooves 4a of the outer ring 4 are formed in straight lines, parallel to the axial direction, in such a manner that the first face gear 1 can be displaced in the axial direction.

As illustrated in FIG. 1, the first face gear 1 is fastened to the inner ring 6 that is incorporated inside the outer ring 4. A threaded hole 6b (refer to FIG. 2A) for fastening the first face gear 1 is formed in the inner ring 6. The inner ring 6 has a spherical outer surface 6c (refer to FIG. 2A), and the ball grooves 6a (refer to FIG. 2A) extending in the axial direction are formed in the spherical outer surface 6c. The ball grooves 6a of the inner ring 6 are formed in straight lines, parallel to the axial direction. A ball rolling path is formed between each of the ball grooves 4a of the outer ring 4 and the respective ball groove 6a of the inner ring 6. Note that the ball grooves 4a and/or 6a of the outer ring 4 and/or the inner ring 6 may be at least partly formed in straight lines, parallel to the axial direction, to allow the axial displacement of the first face gear 1.

The cage 7 is incorporated between the outer ring 4 and the inner ring 6. In the cage 7, the pockets 7a are formed at positions facing the ball rolling paths. The balls 5 are incorporated into the pockets 7a, respectively. The balls 5 can roll along the ball rolling paths.

The cage 7 is in contact with an inner surface of the outer ring 4 and an outer surface of the inner ring 6, and is guided by the inner surface of the outer ring 4 and the outer surface of the inner ring 6. A partial spherical surface 7b in contact with the cylindrical inner surface 4d of the outer ring 4 is formed on an outer surface of the cage 7. A partial spherical surface 7c in contact with the spherical outer surface 6c of the inner ring 6 is formed on an inner surface of the cage 7. A center of curvature $O_1$ of the partial spherical surface 7b and a center of curvature $O_2$ of the partial spherical surface 7c are equidistantly offset to the left and right in the axial direction from the joint center O of the ball spline portion 3. Hence, when the inner ring 6 fastened to the first face gear 1 inclines together with the first face gear 1, the ball 5 is placed on a bisector of the angle of inclination of the inner ring 6.

The motion conversion portion 9 converts the rotational motion of the input portion 8a into the precession of the first face gear 1. The motion conversion portion 9 includes an inclination cam 8b, a plurality of first rolling elements 11 interposed between the inclination cam 8b and the first face gear 1, and a plurality of second rolling elements 13 interposed between the inclination cam 8b and a ring 14 fixed to a housing 19. The inclination cam 8b is formed integrally with the input portion 8a. The first rolling elements 11 and the second rolling elements 13 are held by cages 21 and 22 (refer to FIG. 2A). The motion conversion portion 9 is placed between the housing 19 and the first face gear 1.

As illustrated in FIG. 1, the output portion 15a is rotatably supported by the bearing portion 16. Rolling elements 18 of the bearing portion 16 are rollers, and the bearing portion 16 is, for example, a cross roller bearing. Balls may be used as the rolling elements 18 of the bearing portion 16. The outer ring 17 of the bearing portion 16 is formed integrally with a flange 17a having a through-hole 17c for fastening to the outer ring 4 of the ball spline portion 3 that functions as a housing. An inner ring 15b of the bearing portion 16 is formed integrally with the output portion 15a. The output portion 15a is formed in a hollow shape. A bearing portion 20 that rotatably supports the input portion 8a is incorporated into the output portion 15a.

The configuration of the speed reducing apparatus 10 of the first embodiment has been described above. The speed reducing apparatus 10 of the first embodiment has the following effects:

The ball spline portion 3 allows the axial displacement of the first face gear 1; therefore, even if there are machining errors in and wearing out of the first face gear 1 and the second face gear 2, the first face gear 1 and the second face gear 2 can stay meshed with each other, and it is possible to prevent nonuniformity from occurring in output torque.

The cage 7 of the ball spline portion 3 holds the balls 5; therefore, it is possible to prevent the balls 5 from being caught and to prevent nonuniformity from occurring in output torque.

The center of curvature $O_1$ of the partial spherical surface 7b formed on the outer surface of the cage 7 of the ball spline portion 3 and the center of curvature $O_2$ of the partial spherical surface 7c formed on the inner surface of the cage 7 are offset to the left and right in the axial direction from the joint center O of the ball spline portion 3; therefore, the ball 5 can be displaced onto the bisector of the angle of inclination of the inner ring 6.

Second Embodiment

Figure 3:
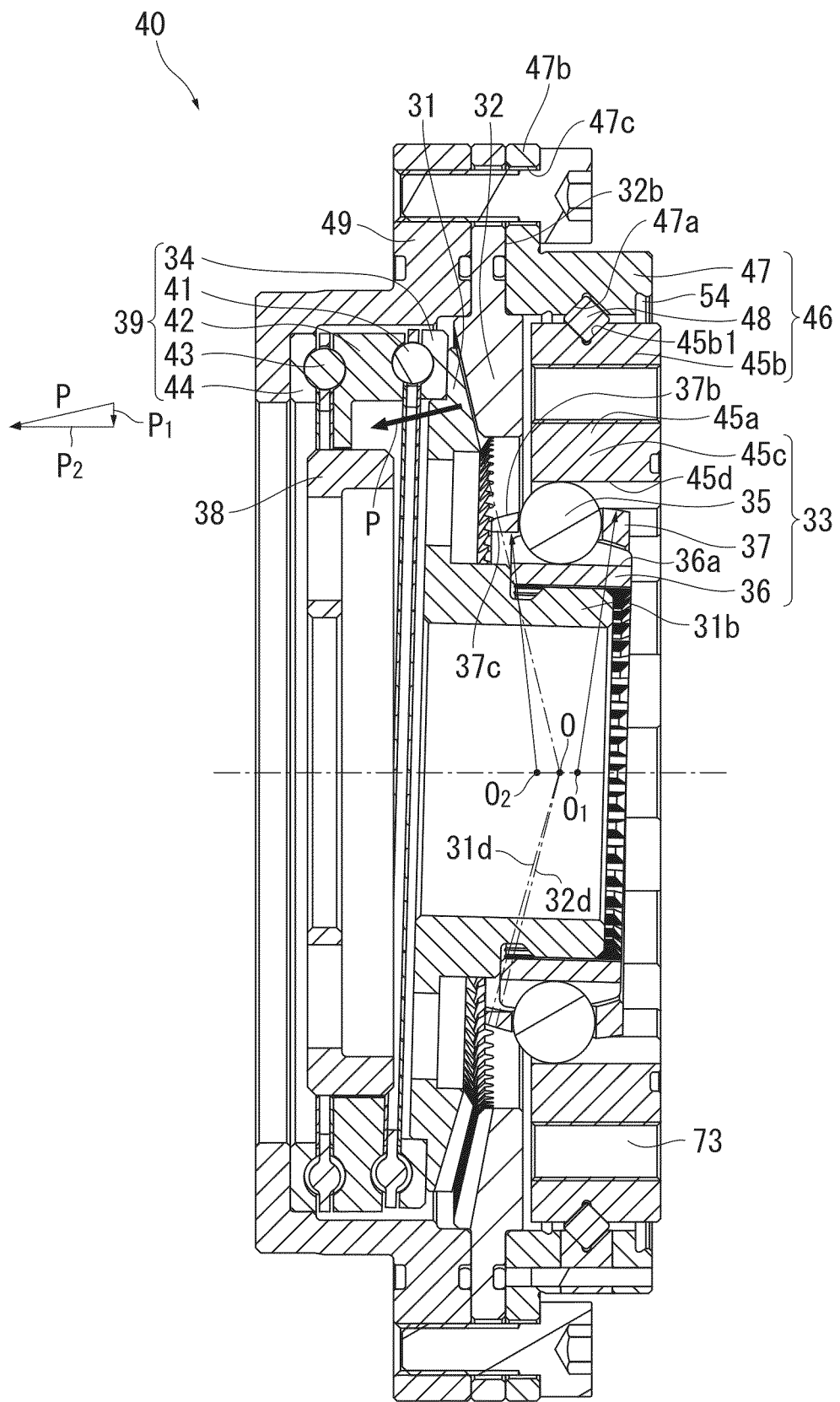
FIG. 3 is a cross-sectional view taken along an axis of a speed reducing apparatus of a second embodiment of the present invention.

FIG. 3 is a cross-sectional view of a speed reducing apparatus 40 of a second embodiment of the present invention. A reference sign 31 denotes a first face gear, and a reference sign 32 denotes a second face gear. A reference sign 33 denotes a ball spline portion that supports the first face gear 31 in an inclinable manner and transmits the rotation of the first face gear 31 to an output portion 45a. A reference sign 46 denotes a bearing portion that rotatably supports the output portion 45a.

A reference sign 38 denotes an input portion, and a reference sign 39 denotes a motion conversion portion that converts the rotational motion of the input portion 38 into the precession of the first face gear 31. In the second embodiment, the second face gear 32 is fixed to a housing 49. The output portion 45a is coupled to the first face gear 31 via the ball spline portion 33.

When the input portion 38 is rotated, the first face gear 31 undergoes precession, and the first face gear 31 decelerates by a difference in the number of teeth from the second face gear 32 and rotates. The rotation of the first face gear 31 at the decreased rotational speed is taken to the output portion 45a via the ball spline portion 33.

Let the number of teeth of the first face gear 31 be $Z_1$, and let the number of teeth of the second face gear 32 be $Z_2$. A speed reducing ratio A of the speed reducing apparatus is expressed by the following equation:

$$A=(Z_2-Z_1)/Z_1$$

Figure 4A:
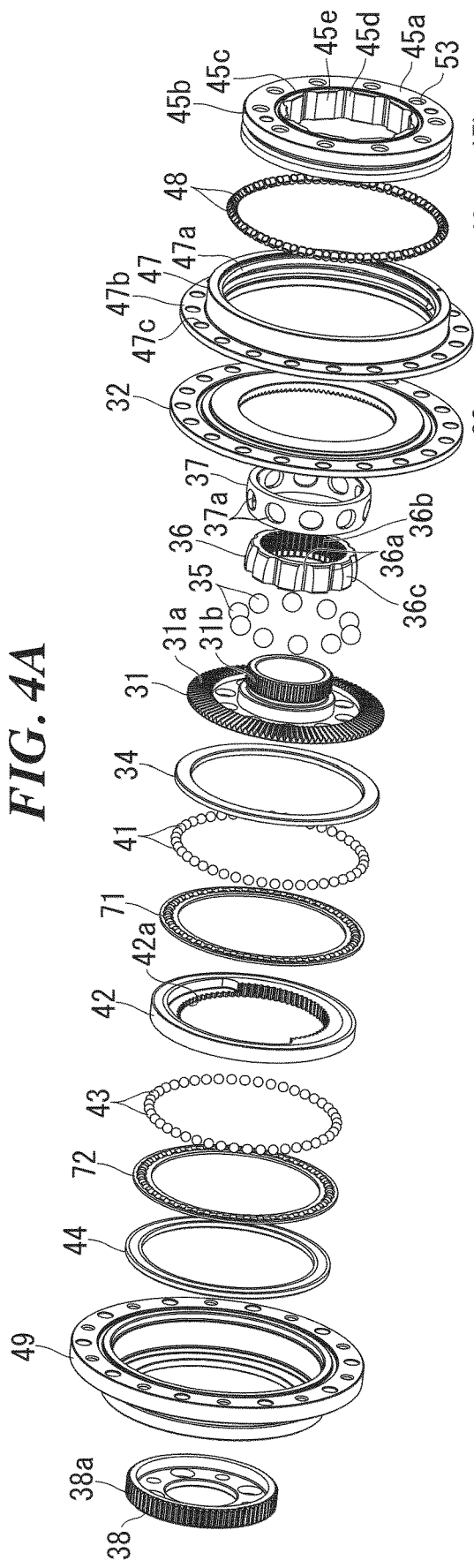
FIGS. 4A and 4B are exploded perspective views of the speed reducing apparatus of the second embodiment of the present invention (FIG. 4A is a perspective view as viewed from an output portion, and FIG. 4B is a perspective view as viewed from an input portion).

The configuration of each portion of the speed reducing apparatus 40 is described below also with reference to exploded perspective views of FIGS. 4A and 4B. FIG. 4A is an exploded perspective view as viewed from the output portion 45a, and FIG. 4B is an exploded perspective view as viewed from the input portion 38.

As illustrated in FIG. 4A, the first face gear 31 has an annular shape. A plurality of teeth 31a is formed radially on a surface, which faces the second face gear 32, of the first face gear 31. As illustrated in FIG. 3, the apex of a conic surface 31d on which the tooth traces of the first face gear 31 extend coincides with a joint center O of the ball spline portion 33. The teeth 31a of the first face gear 31 incline in such a manner that the apex of the conic surface 31d is closer in the axial direction to the bearing portion 46 than the tooth surfaces of the first face gear 31. In other words, the teeth 31a of the first face gear 31 of the second embodiment incline in a direction opposite to the teeth 1a of the first face gear 1 of the first embodiment.

A serrated portion 31b (refer to FIG. 4A) for mounting an inner ring of the ball spline portion 33 is formed, protruding from the first face gear 31. Many grooves extending in the axial direction are formed on an outer surface of the serrated portion 31b.

Figure 4B:
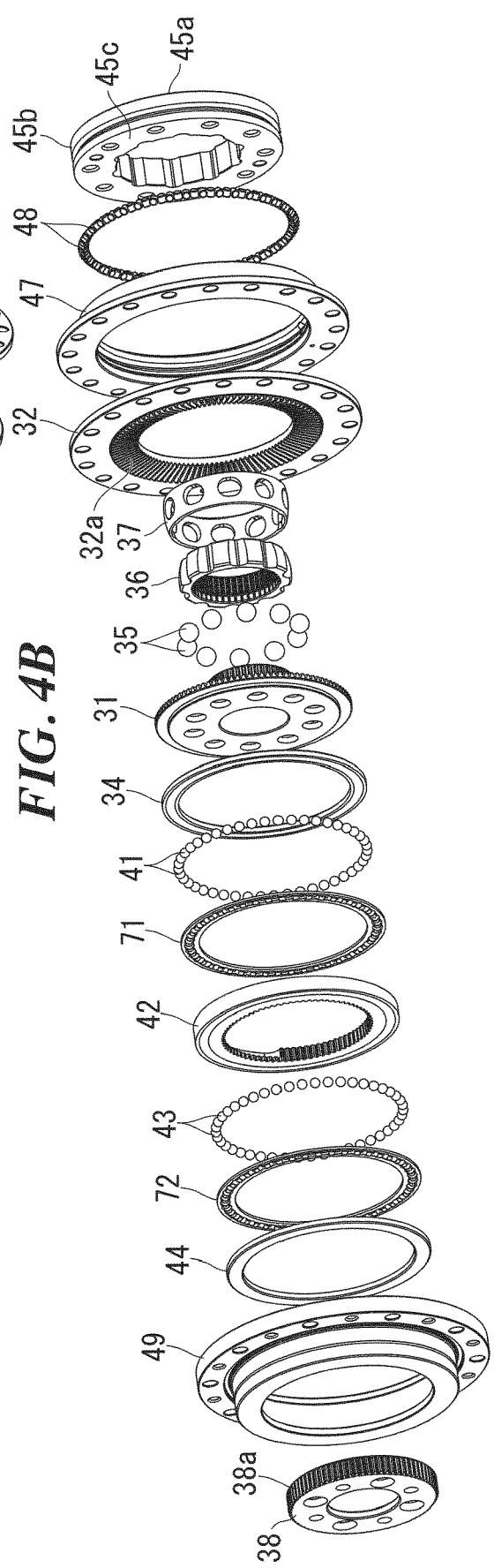

As illustrated in FIG. 4B, the second face gear 32 has an annular shape. A plurality of teeth 32a is formed radially on a surface, which faces the first face gear 31, of the second face gear 32. The number of teeth of the second face gear 32 is different from the number of teeth of the first face gear 31. As illustrated in FIG. 3, the apex of a conic surface 32d on which the tooth traces of the second face gear 32 extend coincides with the joint center O of the ball spline portion 33. The teeth 32a of the second face gear 32 incline in such a manner that the apex of the conic surface 32d is closer in the axial direction to the bearing portion 46 than the tooth surfaces of the second face gear 32. In other words, the teeth 32a of the second face gear 32 of the second embodiment incline in a direction opposite to the teeth 2a of the second face gear 2 of the first embodiment.

As illustrated in FIG. 3, the ball spline portion 33 allows angular displacement of the first face gear 31 and allows axial displacement of the first face gear 31.

The ball spline portion 33 includes an outer ring 45c, an inner ring 36, balls 35 that can roll along ball grooves 45d of the outer ring 45c and ball grooves 36a of the inner ring 36, and a cage 37 having pockets 37a (refer to FIG. 4A) in which the balls 35 are incorporated.

The outer ring 45c has a cylindrical shape and is formed integrally with an inner ring 45b of the bearing portion 46. A plurality of the ball grooves 45d extending in the axial direction is formed in a cylindrical inner surface 45e (refer to FIG. 4A) of the outer ring 45c.

The inner ring 36 that is incorporated inside the outer ring 45c is fitted to the serrated portion 31b of the first face gear 31. A serrated portion 36b (refer to FIG. 4A) including a plurality of grooves extending in the axial direction is formed in an inner surface of the inner ring 36. A plurality of the ball grooves 36a extending in the axial direction is formed in a spherical outer surface 36c of the inner ring 36. A ball rolling path is formed between each of the ball grooves 45d of the outer ring 45c and the respective ball groove 36a of the inner ring 36. Note that the ball grooves 45d and/or 36a of the outer ring 45c and/or the inner ring 36 may be at least partly formed in straight lines, parallel to the axial direction and allow the axial displacement of the first face gear 31.

The cage 37 is incorporated between the outer ring 45c and the inner ring 36. In the cage 37, the pockets 37a are formed at positions facing the ball rolling paths. The balls 35 are incorporated into the pockets 37a, respectively. The balls 35 can roll along the ball rolling paths.

The cage 37 is in contact with an inner surface of the outer ring 45c and an outer surface of the inner ring 36, and is guided by the inner surface of the outer ring 45c and the outer surface of the inner ring 36.

The configurations of the ball grooves 45d formed in the cylindrical inner surface 45e of the outer ring 45c, the ball grooves 36a formed in the spherical outer surface 36c of the inner ring 36, and partial spherical surfaces 37b and 37c formed on an outer and an inner surface of the cage 37 are substantially the same as those of the first embodiment.

A center of curvature $O_1$ of the partial spherical surface 37b of the outer surface of the cage 37 and a center of curvature $O_2$ of the partial spherical surface 37c of the inner surface of the cage 37 are equidistantly offset to the left and right in the axial direction from the joint center O of the ball spline portion 33. Hence, when the inner ring 36 mounted on the first face gear 31 inclines together with the first face gear 31, the ball 35 is displaced onto a bisector of the angle of inclination of the inner ring 36, and constant-speed rotation is transmitted between the first face gear 31 and the output portion 45a.

The motion conversion portion 39 converts the rotational motion of the input portion 38 into the precession of the first face gear 31. The motion conversion portion 39 includes an inclination cam 42, a plurality of first rolling elements 41 interposed between the inclination cam 42 and a ring 34 that is fixed to the first face gear 31, and a plurality of second rolling elements 43 interposed between the inclination cam 42 and a ring 44 that is fixed to the housing 49. The first rolling elements 41 and the second rolling elements 43 are held by cages 71 and 72 (refer to FIG. 4A). The motion conversion portion 39 is placed between the housing 49 and the first face gear 31. A serrated portion 42a (refer to FIG. 4A) including many grooves extending in the axial direction is formed on an inner surface of the inclination cam 42. A serrated portion 38a (refer to FIG. 4A) including many grooves extending in the axial direction is formed on an outer surface of the input portion 38. The input portion 38 and the inclination cam 42 are non-rotatably coupled via the serrated portions 38a and 42a. The input portion 38 is formed in a hollow shape.

As illustrated in FIG. 3, the output portion 45a is rotatably supported by the bearing portion 46. The bearing portion 46 includes an outer ring 47 having an inner surface in which a rolling element groove 47a extending in the circumferential direction is formed, the inner ring 45b having an outer surface in which a rolling element groove 45b1 extending in the circumferential direction is formed, and rolling elements 48 that can roll along the rolling element groove 47a of the outer ring 47 and the rolling element groove 45b1 of the inner ring 45b. The rolling elements 48 are rollers, and the bearing portion 46 is, for example, a cross roller bearing. Balls may be used as the rolling elements 48.

The outer ring 47 is formed integrally with a flange 47b having a through-hole 47c for fastening to the housing 49. The flange 47b protrudes more toward the second face gear 32 than the inner ring 45b. The flange 47b fits into a recess 32b of the second face gear 32 to enable centering the bearing portion 46. The second face gear 32 is fastened to the housing 49 together with the outer ring 47.

The inner ring 45b of the bearing portion 46 is formed integrally with the outer ring 45c of the ball spline portion 33. Moreover, the inner ring 45b is formed integrally with the output portion 45a. A seal 54 is provided between the outer ring 47 and the inner ring 45b of the bearing portion 46. A plurality of threaded holes 73 for mounting on a mating component such as an output shaft is formed in the output portion 45a.

The configuration of the speed reducing apparatus 40 of the second embodiment has been described above. The speed reducing apparatus 40 of the second embodiment has the following effects substantially similarly to the speed reducing apparatus of the first embodiment.

The ball spline portion 33 allows the axial displacement of the first face gear 31; therefore, even if there are machining errors in and wearing out of the first face gear 31 and the second face gear 32, the first face gear 31 and the second face gear 32 can stay meshed with each other, and it is possible to prevent nonuniformity from occurring in output torque.

The cage 37 of the ball spline portion 33 holds the balls 35; therefore, it is possible to prevent the balls 35 from being caught and to prevent nonuniformity from occurring in output torque.

The center of curvature $O_1$ of the partial spherical surface 37b formed on the outer surface of the cage 37 of the ball spline portion 33 and the center of curvature $O_2$ of the partial spherical surface 37c formed on the inner surface of the cage 37 are offset to the left and right in the axial direction from the joint center O of the ball spline portion 33; therefore, the ball 35 is displaced onto the bisector of the angle of inclination of the inner ring 36. Hence, it is possible to transmit constant-speed rotation between the first face gear 31 and the output portion 45a and prevent nonuniformity from occurring in output torque.

Moreover, the speed reducing apparatus 40 of the second embodiment further has the following effects:

The outer ring 45c of the ball spline portion 33 is formed integrally with the inner ring 45b of the bearing portion 46; therefore, the number of parts can be reduced, and the speed reducing apparatus 40 can be downsized.

The output portion 45a is formed integrally with the outer ring 45c of the ball spline portion 33 and the inner ring 45b of the bearing portion 46; therefore, the number of parts can be reduced, and the speed reducing apparatus 40 can be downsized.

The outer ring 47 of the bearing portion 46 is formed integrally with the flange 47b having the through-hole 47c for fastening the outer ring 47 to the housing 49 of the speed reducing apparatus 40; therefore, the speed reducing apparatus 40 can be downsized.

When torque is applied to the input portion 38, a reaction force P (refer to FIG. 3) acts on the meshing portion between the first face gear 31 and the second face gear 32. The reaction force P is divided into a radial component $P_1$ and an axial component $P_2$. The radial component $P_1$ is transmitted to the output portion 45a via the balls 35 of the ball spline portion 33. In the embodiment, the teeth 31a and 32a of the first face gear 31 and the second face gear 32 incline in such a manner that the apex O of the conic surfaces 31d and 32d where the tooth traces extend is closer in the axial direction to the bearing portion 46 than the tooth surfaces of the first face gear 31 and the second face gear 32. The joint center O of the ball spline portion 33 coincides with the apex O of the conic surfaces 31d and 32d; therefore, the balls 35 of the ball spline portion 33 can be brought closer in the axial direction to the rolling elements 48 of the bearing portion 46 (the balls 35 of the ball spline portion 33 and the rolling elements 48 of the bearing portion 46 are placed in a substantially straight line) by inclining the teeth 31a and 32a of the first face gear 31 and the second face gear 32 as described above. If the balls 35 of the ball spline portion 33 and the rolling elements 48 of the bearing portion 46 are apart from each other in the axial direction, the output portion 45a may swing on the bearing portion 46 due to the radial component $P_1$. It is possible to prevent the output portion 45a from swinging by bringing the balls 35 of the ball spline portion 33 closer in the axial direction to the rolling elements 48 of the bearing portion 46.

Third Embodiment

Figure 5:
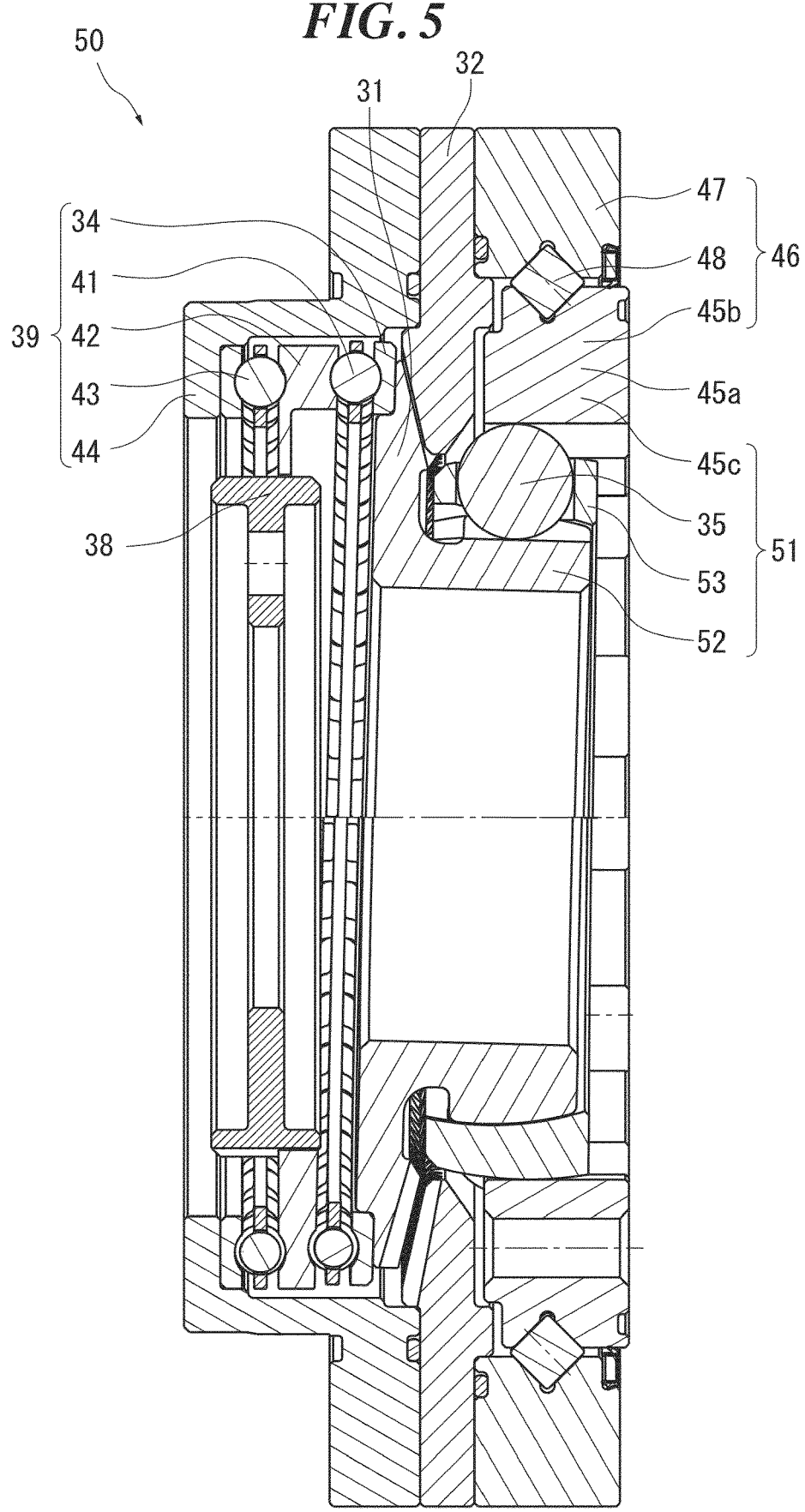
FIG. 5 is a cross-sectional view taken along an axis of a speed reducing apparatus of a third embodiment of the present invention.

FIG. 5 is a cross-sectional view of a speed reducing apparatus 50 of a third embodiment of the present invention. As in the speed reducing apparatus 40 of the second embodiment, the speed reducing apparatus 50 of the third embodiment also includes a first face gear 31, a second face gear 32, an input portion 38, a motion conversion portion 39, a bearing portion 46, and an output portion 45a. When the input portion 38 is rotated, the first face gear 31 undergoes precession, and the first face gear 31 decelerates by a difference in the number of teeth from the second face gear 32 and rotates. The rotation of the first face gear 31 at the decreased rotational speed is taken to the output portion 45a via a ball spline portion 51. The ball spline portion 51 allows the precession of the first face gear 31 and allows the axial displacement of the first face gear 31. The configurations of the first face gear 31, the second face gear 32, the input portion 38, the motion conversion portion 39, the bearing portion 46, and the output portion 45a are substantially the same as those of the speed reducing apparatus 40 of the second embodiment; therefore, the same reference signs are assigned thereto and a description thereof is omitted.

Figure 6A:
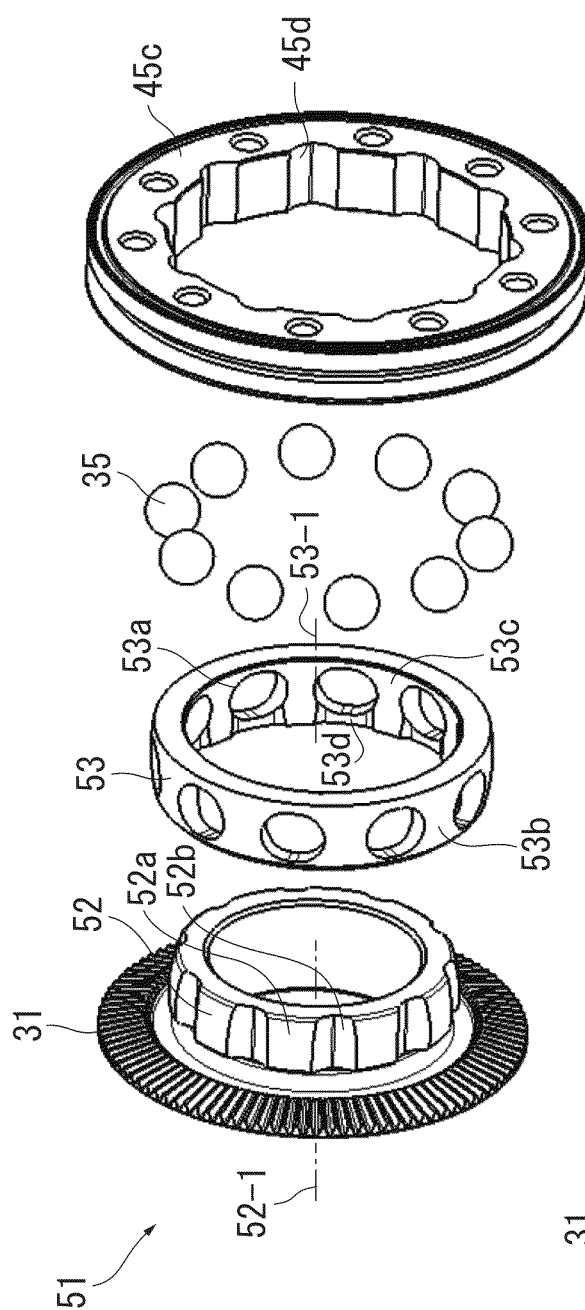
FIG. 6A illustrates an exploded perspective view of a ball spline portion of the speed reducing apparatus of the third embodiment of the present invention.
Figure 6B:
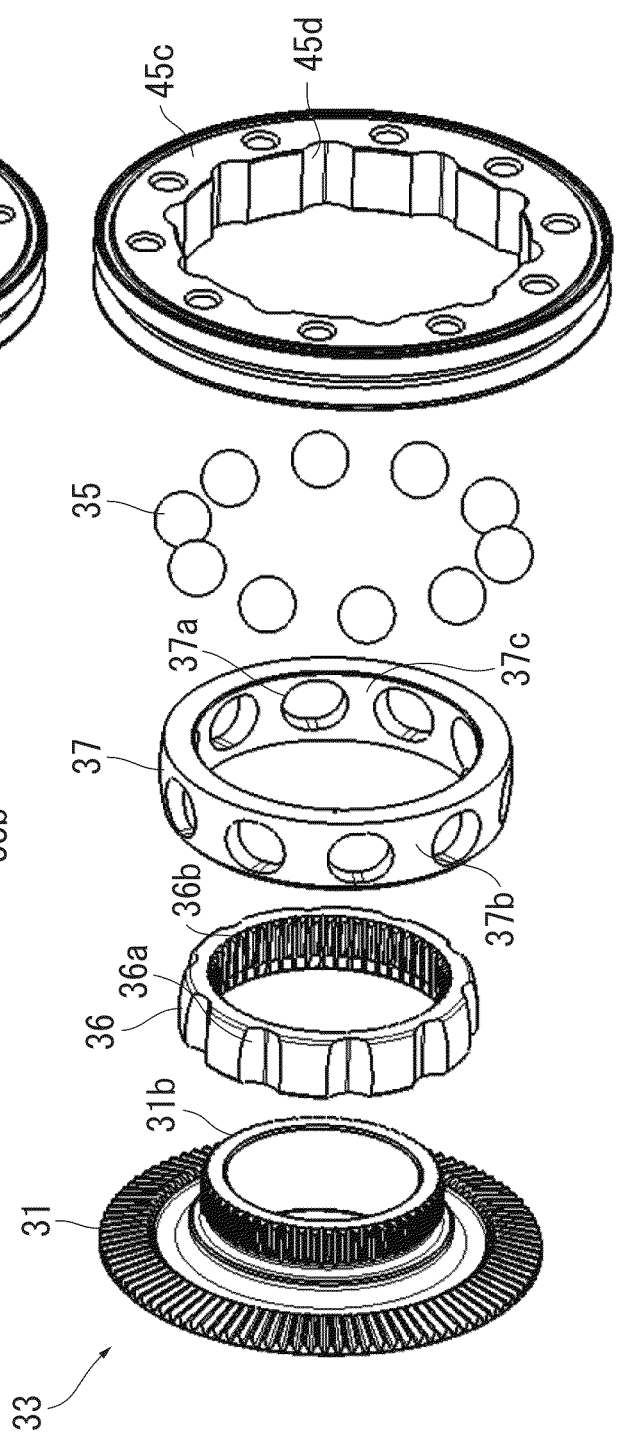
FIG. 6B illustrates an exploded perspective view of a ball spline portion of the speed reducing apparatus of the second embodiment of the present invention.

FIGS. 6A and 6B are exploded perspective views of a comparison between the ball spline portion 51 (FIG. 6A) of the speed reducing apparatus 50 of the third embodiment and the ball spline portion 33 (FIG. 6B) of the speed reducing apparatus 40 of the second embodiment. As illustrated in FIG. 6A, the ball spline portion 51 of the speed reducing apparatus 50 of the third embodiment includes an outer ring 45c, an inner ring 52, balls 35 that can roll along ball grooves 45d of the outer ring 45c and ball grooves 52b of the inner ring 52, and a cage 53 having pockets 53a in which the balls 35 are incorporated. The configurations of the outer ring 45c and the balls 35 are the same as those of the ball spline portion 33 of the second embodiment; therefore, the same reference signs are assigned thereto and a description thereof is omitted.

As illustrated in FIG. 6A, a plurality of the ball grooves 52b extending in the axial direction is formed in a spherical outer surface 52a of the inner ring 52. A ball rolling path is formed between each of the ball grooves 45d of the outer ring 45c and the respective ball groove 52b of the inner ring 52. The configurations of the spherical outer surface 52a and the ball grooves 52b of the inner ring 52 are the same as those of the inner ring 36 of the ball spline portion 33 of the second embodiment.

The cage 53 is incorporated between the outer ring 45c and the inner ring 52. In the cage 53, the pockets 53a are formed at positions facing the ball rolling paths. The balls 35 are incorporated into pockets the 53a, respectively. The configurations of the pockets 53a of the cage 53, a partial spherical surface 53b on an outer surface of the cage 53, and a partial spherical surface 53c on an inner surface of the cage 53 are the same as those of the cage 37 of the ball spline portion 33 of the second embodiment.

As illustrated in FIG. 6B, in the ball spline portion 33 of the second embodiment, the cylindrical serrated portion 31b of the first face gear 31 is press-fitted into the serrated portion 36b on the inner surface of the inner ring 36. On the other hand, as illustrated in FIG. 6A, in the ball spline portion 51 of the third embodiment, the first face gear 31 is formed integrally with the inner ring 52.

Figure 7:
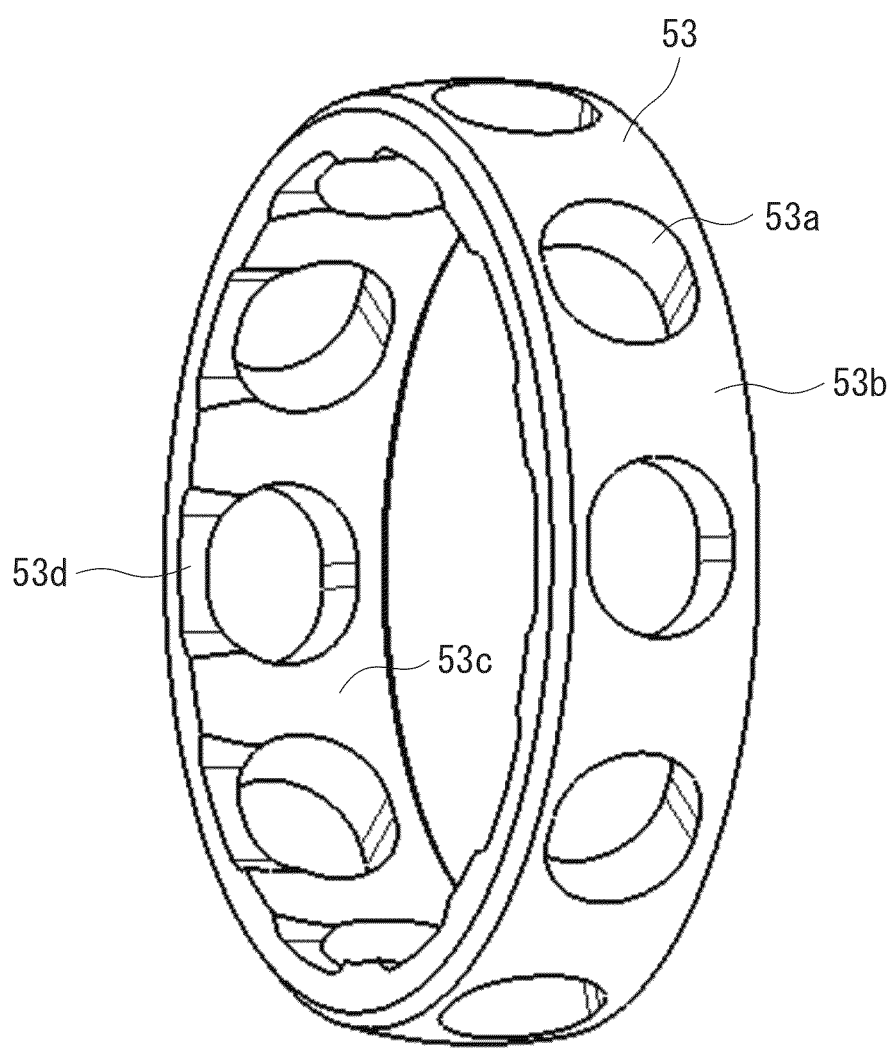
FIG. 7 is an enlarged view of a cage of the speed reducing apparatus of the third embodiment of the present invention.

Moreover, as illustrated in FIG. 6A, in the ball spline portion 51 of the third embodiment, notch portions 53d that allow passage of the protrusions (spherical outer surface) 52a between the ball grooves 52b of the inner ring 52 are formed in the cage 53 in such a manner that the inner ring 52 can be inserted into the cage 53 in a state where an axis 53-1 of the cage 53 and an axis 52-1 of the inner ring 52 are aligned (also refer to an enlarged view of FIG. 7). The notch portions 53d are formed continuously with the pockets 53a. The number of the notch portions 53d is the same as the number of the pockets 53a.

Figure 8:
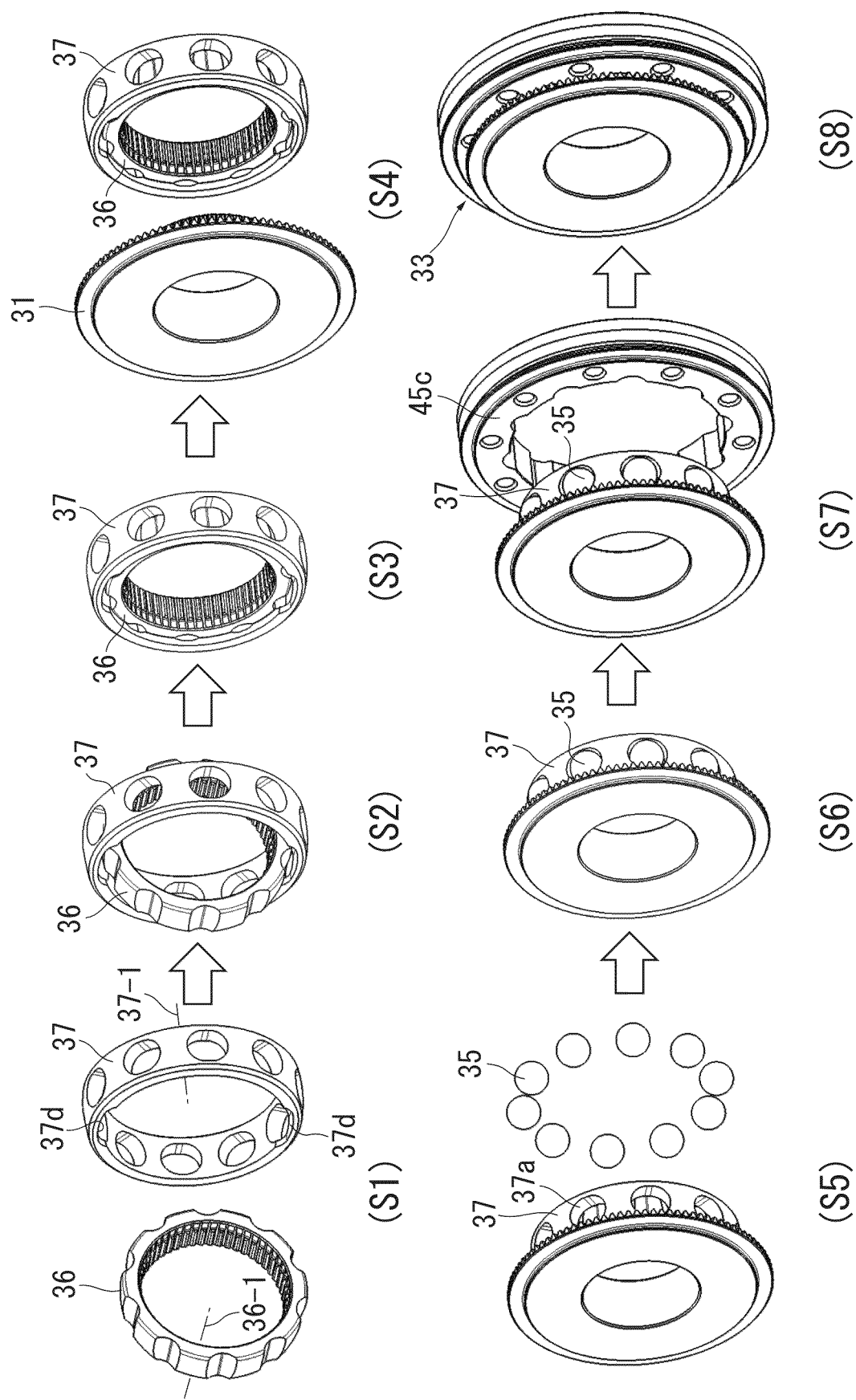
FIG. 8 is an assembly process diagram of the ball spline portion of the speed reducing apparatus of the second embodiment of the present invention.
Figure 9:
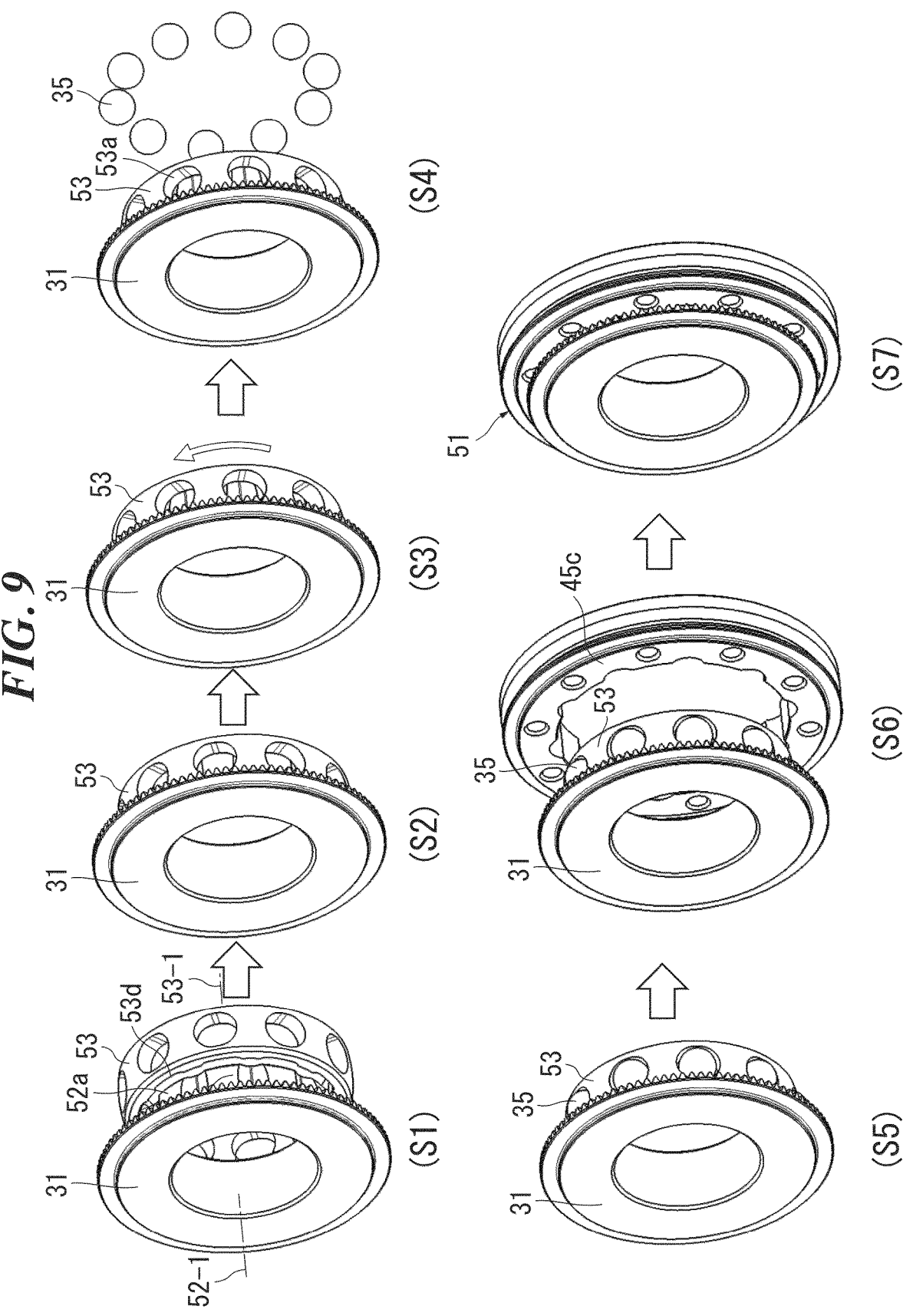
FIG. 9 is an assembly process diagram of the ball spline portion of the speed reducing apparatus of the third embodiment of the present invention.
Figure 10:
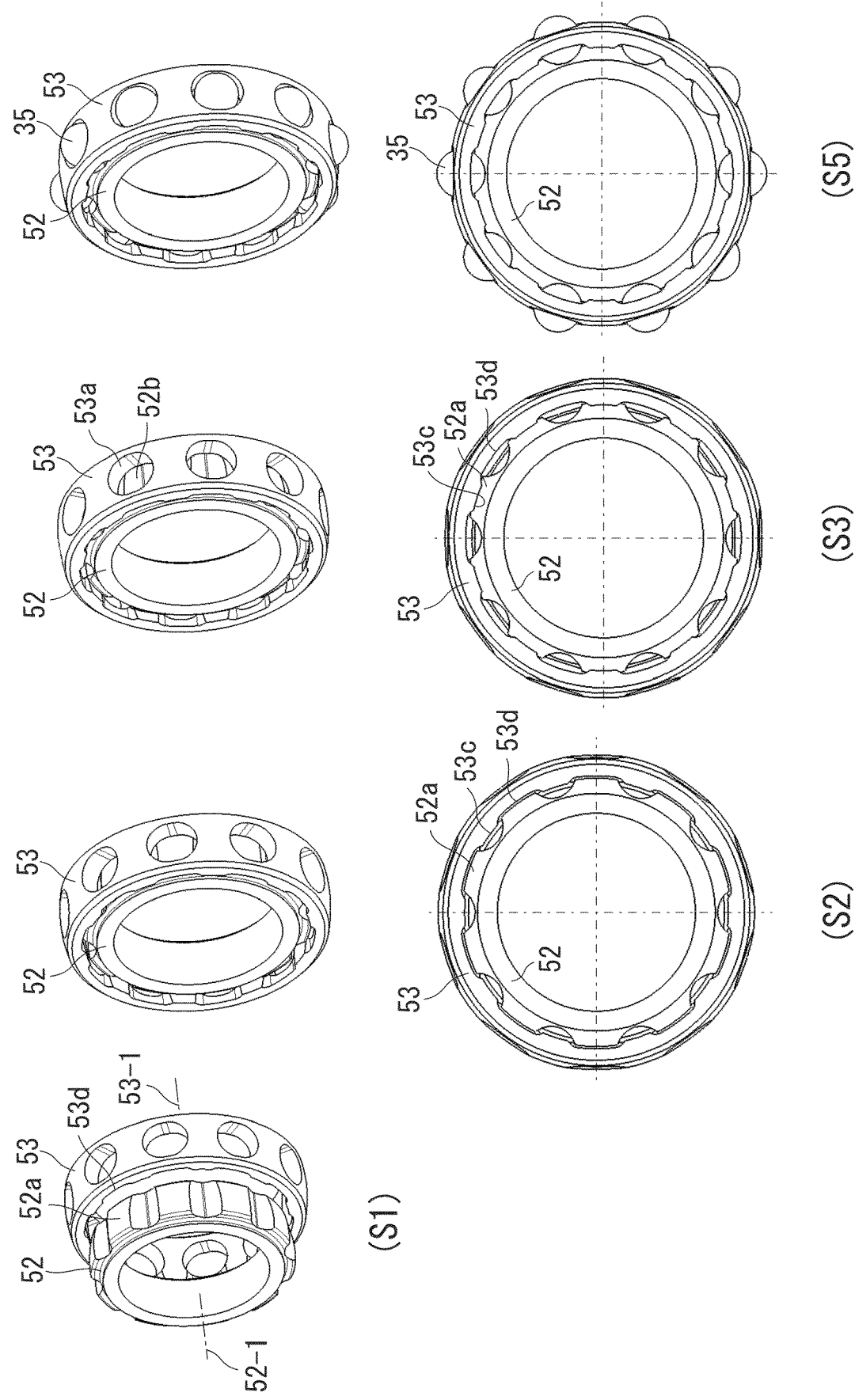
FIG. 10 is an assembly process diagram of the speed reducing apparatus of the third embodiment of the present invention (a diagram illustrating only an inner ring by cutting a gear portion of a first face gear).

FIG. 8 illustrates an assembly process diagram of the ball spline portion 33 of the second embodiment. FIGS. 9 and 10 illustrate assembly process diagrams of the ball spline portion 51 of the third embodiment. In FIG. 10, for easy understanding, a flange-shaped gear portion of the first face gear 31 of FIG. 9 is cut away, and only the inner ring 52 is illustrated.

As illustrated in FIG. 8, in the ball spline portion 33 of the second embodiment, the inner ring 36 is inserted, aligned with two notch portions 37d on the cage 37 in a state where an axis 37-1 of the cage 37 is orthogonal to an axis 36-1 of the inner ring 36, in other words, in a state where the inner ring 36 is inclined 90° relative to the cage 37 (S1 and S2). The inner surface of the cage 37 has undercuts; therefore, it is necessary to form the notch portions 37d to insert the inner ring 36. Next, the inner ring 36 is rotated 90° in the cage 37 (S2 and S3). Next, the first face gear 31 is press-fitted into the inner ring 36 (S4). Next, the balls 35 are inserted into the pockets 37a of the cage 37 (S5 and S6), and the cage 37 and the inner ring 36 are incorporated into the outer ring 45c (S7). Consequently, the assembly of the ball spline portion 33 is complete (S8).

On the other hand, as illustrated in FIGS. 9 and 10, in the ball spline portion 51 of the third embodiment, the inner ring 52 is inserted into the cage 53 in a state where the axis 53-1 of the cage 53 is aligned with the axis 52-1 of the inner ring 52 and the protrusions 52a of the inner ring 52 are aligned in phase with the notch portions 53d of the cage 53 (S1 and S2). Next, the cage 53 is rotated 360°/2N (N is the number of the protrusions 52a) about the axis 53-1 of the cage 53 (S3). At this point in time, as illustrated in the upper row of S3 of FIG. 10, the pockets 53a of the cage 53 face the ball grooves 52b of the inner ring 52. As illustrated in the lower row of S3 of FIG. 10, the partial spherical surface 53c on the inner surface of the cage 53 then meshes with the protrusions 52a of the inner ring 52. Hence, the cage 53 cannot move in the axial direction relative to the inner ring 52. Next, the balls 35 are inserted into the pockets 53a of the cage 53 (S4 and S5). The rotation of the cage 53 is prevented by inserting the balls 35, which prevents the cage 53 from rotating backward in such a manner that the notch portions 53d of the cage 53 are aligned in phase with the protrusions 52a of the inner ring 52 and then falling off the inner ring 52. Next, the cage 53 and the inner ring 52 are incorporated into the outer ring 45c (S6). Consequently, the assembly of the ball spline portion 51 is complete (S7).

(Modification of Ball Spline Portion of Speed Reducing Apparatus of Third Embodiment)

Figure 11A:
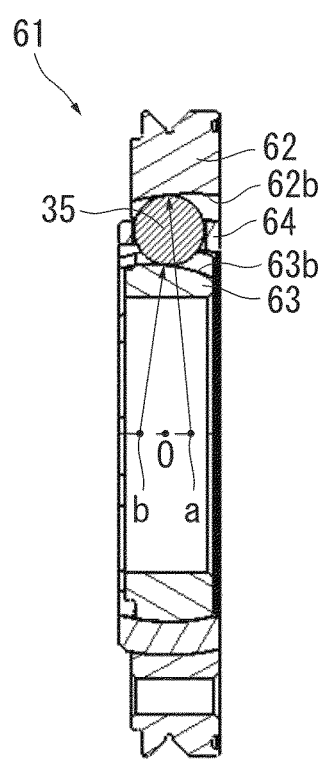
FIGS. 11A and 11B are diagrams illustrating a modification of the ball spline portion of the speed reducing apparatus of the third embodiment of the present invention (FIG. 11B is a front view, and FIG. 11A is a cross-sectional view taken along line A-A of FIG. 11B).
Figure 11B:
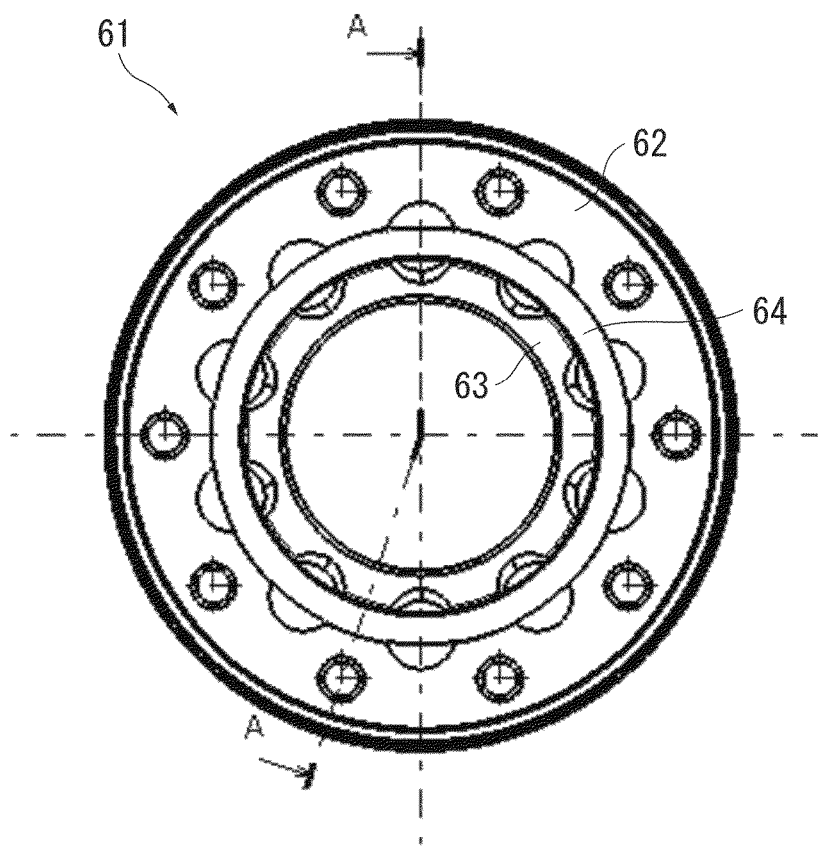
Figure 12:
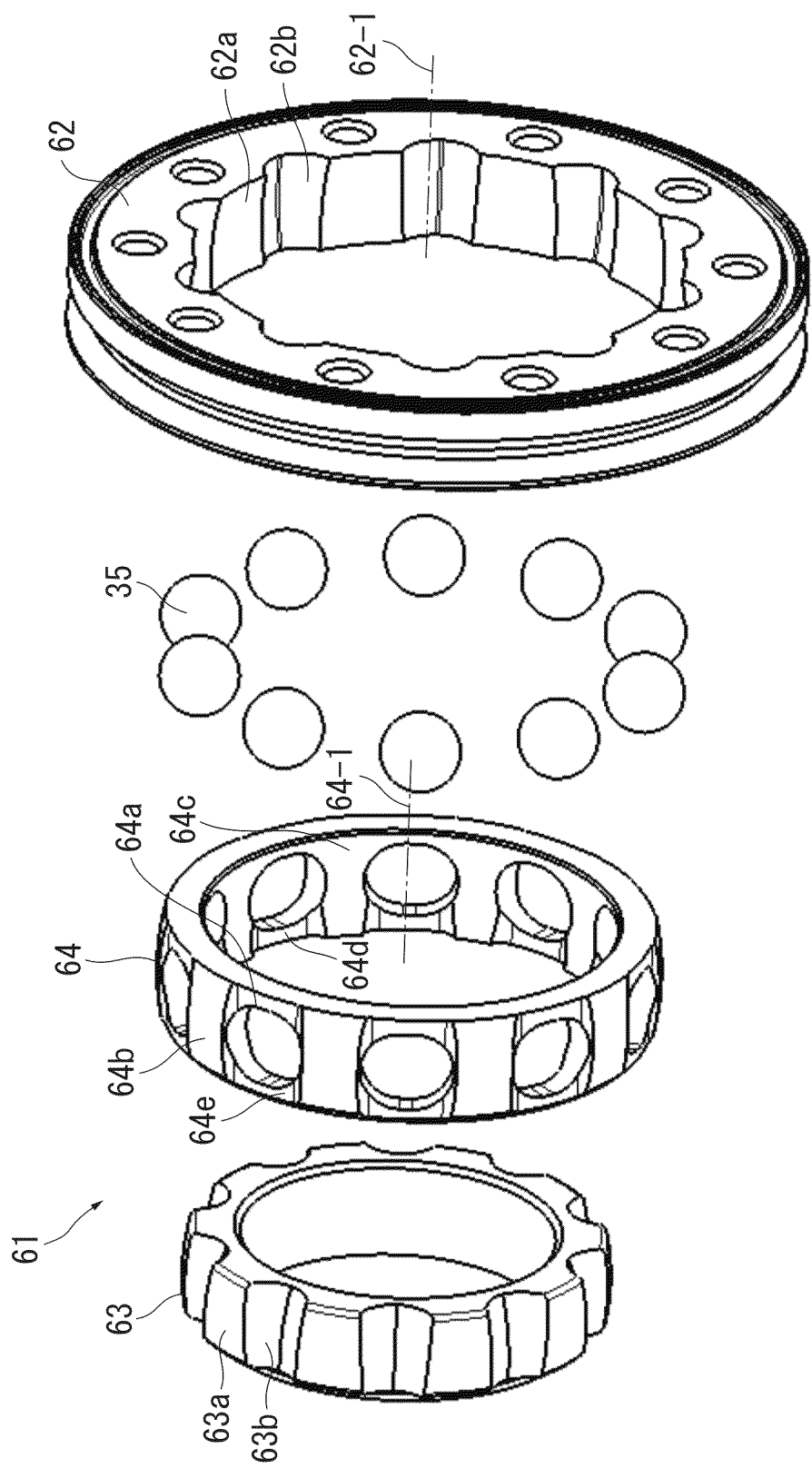
FIG. 12 is an exploded perspective view of the ball spline portion of the modification.

FIGS. 11A, 11B and 12 illustrate a modification 61 of the ball spline portion 51 of the speed reducing apparatus 50 of the third embodiment. In the ball spline portion 51 of the speed reducing apparatus 50 of the third embodiment, the straight ball grooves 45d and 52b extending in the axial direction are formed in the outer ring 45c and the inner ring 52 to allow the axial displacement of the inner ring 52 relative to the outer ring 45c.

On the other hand, as illustrated in FIGS. 11A, 11B and 12, in the ball spline portion 61 of the modification, arc-shaped ball grooves 62b are formed in a spherical inner surface 62a of an outer ring 62, and arc-shaped ball grooves 63b are formed in a spherical outer surface 63a of an inner ring 63, to make the inner ring 63 unmovable in the axial direction relative to the outer ring 62. Note that the inner ring 63 is actually formed integrally with the first face gear 31, but only the inner ring 63 is illustrated in FIGS. 11A, 11B and 12 for easy understanding.

As illustrated in FIG. 12, the spherical inner surface 62a is formed on the outer ring 62. A plurality of the arc-shaped ball grooves 62b is formed in the circumferential direction in the spherical inner surface 62a. The spherical outer surface 63a is formed on the inner ring 63. A plurality of the arc-shaped ball grooves 63b is formed in the circumferential direction in the spherical outer surface 63a. As illustrated in FIG. 11A, a center of curvature a of the arc-shaped ball groove 62b of the outer ring 62 and a center of curvature b of the arc-shaped ball groove 63b of the inner ring 63 are equidistantly offset to the left and right in the axial direction from a joint center O of the ball spline portion 61.

As illustrated in FIG. 12, pockets 64a into which the balls 35 are inserted are formed in a cage 64. A partial spherical surface 64b that is guided by and in contact with the spherical inner surface 62a of the outer ring 62 is formed on an outer surface of the cage 64. A partial spherical surface 64c that is guided by and in contact with the spherical outer surface 63a of the inner ring 63 is formed on an inner surface of the cage 64. Notch portions 64d that allow passage of the protrusions (spherical outer surface) 63a between the ball grooves 63b of the inner ring 63 are formed in the inner surface of the cage 64. The configurations of the pockets 64a, the notch portions 64d, and the partial spherical surfaces 64b and 64c of the cage 64 are the same as those of the cage 53 of the ball spline portion 51 of the third embodiment.

As illustrated in FIG. 12, in the ball spline portion 61 of the modification, relief grooves 64e that allow passage of the protrusions (spherical inner surface) 62a between the ball grooves 62b of the outer ring 62 are formed in the outer surface of the cage 64 in such a manner that the cage 64 can be inserted into the outer ring 62 in a state where an axis 64-1 of the cage 64 is aligned with an axis 62-1 of the outer ring 62. The relief grooves 64e are formed continuously with the pockets 64a and extend in the axial direction along the entire length of the cage 64. The number of the relief grooves 64e is the same as the number of the pockets 64a.

Figure 13:
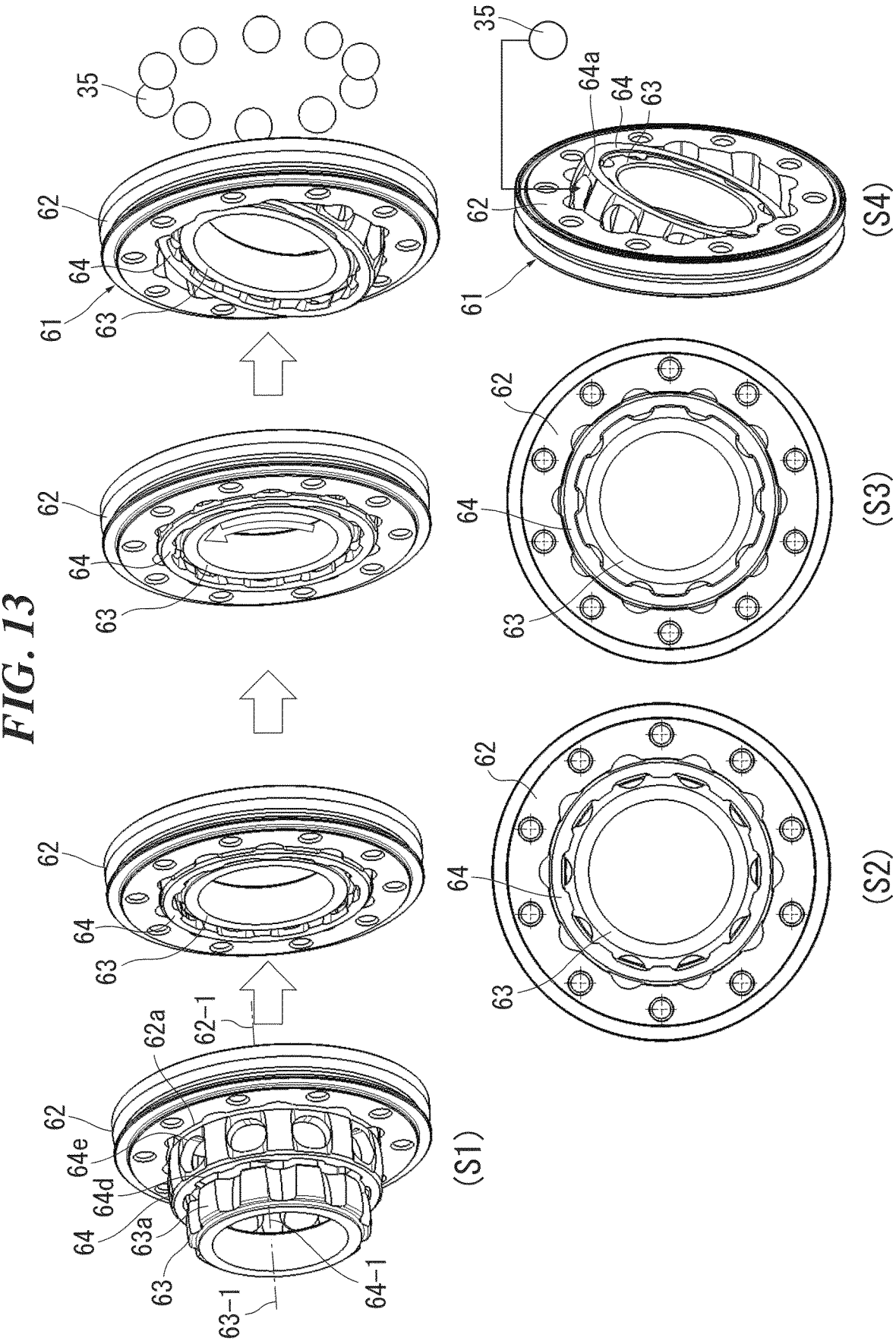
FIG. 13 is an assembly process diagram of the ball spline portion of the modification.

FIG. 13 illustrates an assembly process diagram of the ball spline portion 61 of the modification. As illustrated in S1 and S2 of FIG. 13, the cage 64 is inserted into the outer ring 62 in a state where the axis 64-1 of the cage 64 is aligned with the axis 62-1 of the outer ring 62 and the protrusions 62a of the outer ring 62 are aligned in phase with the relief grooves 64e of the cage 64. Similarly, the inner ring 63 is inserted into the cage 64 in a state where the axis 64-1 of the cage 64 is aligned with an axis 63-1 of the inner ring 63 and the protrusions 63a of the inner ring 63 are aligned in phase with the notch portions 64d of the cage 64 (S1 and S2). Next, as illustrated in S3 of FIG. 13, the cage 64 is rotated 360°/2N (N is the number of the protrusions 62a) about the axis 64-1 of the cage 64 (S3). Next, as illustrated in S4 of FIG. 13, the cage 64 and the inner ring 63 are inclined, and the balls 35 are inserted into the pockets 64a of the cage 64 (S4). Consequently, the assembly of the ball spline portion 61 is complete.

The configuration of the speed reducing apparatus 50 of the third embodiment has been described above. The speed reducing apparatus 50 of the third embodiment has substantially similar effects to the speed reducing apparatus 40 of the second embodiment, and further has the following effects.

The first face gear 31 is formed integrally with the inner ring 52/63 of the ball spline portion 51/61; therefore, the coaxial accuracy between the first face gear 31 and the inner ring 52/63 of the ball spline portion 51/61 can be increased. Hence, it is possible to cause the first face gear 31 to accurately undergo precession, and the efficiency of the speed reducing apparatus 50 is increased.

It is not necessary to form a serrated portion on the first face gear 31 and the inner ring 52/63; therefore, it is possible to enlarge a hollow hole that can be effectively used as a space for, for example, wiring.

The step of press-fitting the first face gear 31 into the inner ring 52/63 is not required; therefore, the assembly of the ball spline portion 51/61 is facilitated.

After the ball spline portion 51/61 is assembled, the ball spline portion 51/61 can be disassembled. This effect is described in detail. In the speed reducing apparatus 40 of the second embodiment, the first face gear 31 is press-fitted into the inner ring 36; therefore, after assembly, the inner ring 36 cannot be inclined 90° relative to the cage 37 and the inner ring 36 cannot be disassembled from the cage 37. On the other hand, in the speed reducing apparatus 50 of the third embodiment, if the balls 35 are removed from the cage 53/64 and the cage 53/64 is rotated 360°/2N relative to the inner ring 52/63, the inner ring 52/63 can be disassembled from the cage 53/64.

Note that the present invention is not limited to concretizations thereof as the above embodiments, and can be concretized as other embodiments without changing the gist of the present invention.

For example, in the above embodiments, the example in which the present invention is applied to a speed reducing apparatus has been described. However, the present invention can also be applied to a speed increasing apparatus by exchanging the input side and the output side.

The present description is based on Japanese Patent Application No. 2021-067556 filed on Apr. 13, 2021. The entire contents thereof are included herein.

REFERENCE SIGNS LIST

1 First face gear
2 Second face gear
3 Ball spline portion
4 Outer ring of ball spline portion
4a Ball groove of outer ring
5 Ball of ball spline portion
6 Inner ring of ball spline portion
6a Ball groove of inner ring
7 Cage
7a Pocket of cage
7b Partial spherical surface on outer surface of cage
7c Partial spherical surface on inner surface of cage
10 Speed reducing apparatus
31 First face gear
31a Tooth of first face gear
31d Conic surface on which tooth traces of first face gear extend
32 Second face gear
32a Tooth of second face gear
32d Conic surface on which tooth traces of second face gear extend
33 Ball spline portion
35 Ball of ball spline portion
36 Inner ring of ball spline portion
36a Ball groove of inner ring
37 Cage
37a Pocket of cage
37b Partial spherical surface on outer surface of cage
37c Partial spherical surface on inner surface of cage
40 Speed reducing apparatus
45a Output portion
45b Inner ring of bearing portion
45b1 Rolling element groove of inner ring of bearing portion
45c Outer ring of ball spline portion
45d Ball groove of outer ring of ball spline portion
46 Bearing portion
47 Outer ring of bearing portion
47a Rolling element groove of outer ring of bearing portion
47b Flange
48 Rolling element
51 Ball spline portion
52 Inner ring of ball spline portion
52a Protrusion of inner ring
52b Ball groove of inner ring
52-1 Axis of inner ring
53 Cage
53a Pocket
53d Notch portion
53-1 Axis of cage
61 Ball spline portion
62 Outer ring of ball spline portion
63 Inner ring of ball spline portion
63a Protrusion of inner ring
63b Ball groove of inner ring
63-1 Axis of inner ring
64 Cage
64a Pocket
64d Notch portion
64-1 Axis of cage
O Joint center of ball spline portion
$O_1$ Center of curvature of partial spherical surface formed on outer surface of cage
$O_2$ Center of curvature of partial spherical surface formed on inner surface of cage

The invention claimed is:
1. A speed reducing or increasing apparatus that causes a first face gear to incline to mesh with a second face gear and causes the first face gear to oscillate to move a meshing portion in a circumferential direction, the speed reducing or increasing apparatus comprising:

a ball spline portion supporting the first face gear in an inclinable manner, the ball spline portion allowing axial displacement of the first face gear, the ball spline portion including
an outer ring comprising a ball groove,
an inner ring comprising a ball groove,
a ball configured to roll along the ball groove of the outer ring and the ball groove of the inner ring, and
a cage having a pocket in which the ball is incorporated; and
a motion conversion portion converting rotational motion of an input portion into precession of the first face gear, the motion conversion portion including
an inclination cam,
a plurality of first rolling elements interposed between the inclination cam and a first ring that is fixed to the first face gear, and
a plurality of second rolling elements interposed between the inclination cam and a second ring that is fixed to a housing, the motion conversion portion being disposed between the housing and the first face gear.

2. The speed reducing or increasing apparatus according to claim 1, wherein one or more of the ball groove of the outer ring and the ball groove of the inner ring of the ball spline portion are at least partly formed in straight lines, parallel to the axial direction.

3. The speed reducing or increasing apparatus according to claim 2, wherein apices of conic surfaces on which tooth traces of the first face gear and the second face gear extend coincide with a joint center of the ball spline portion.

4. The speed reducing or increasing apparatus according to claim 3, wherein a center of curvature of a partial spherical surface formed on an outer surface of the cage and a center of curvature of a partial spherical surface formed on an inner surface of the cage are offset to the left and right in the axial direction relative to the joint center of the ball spline portion.

5. The speed reducing or increasing apparatus according to claim 2, wherein a center of curvature of a partial spherical surface formed on an outer surface of the cage and a center of curvature of a partial spherical surface formed on an inner surface of the cage are offset to the left and right in the axial direction relative to the joint center of the ball spline portion.

6. The speed reducing or increasing apparatus according to claim 1, wherein apices of conic surfaces on which tooth traces of the first face gear and the second face gear extend coincide with a joint center of the ball spline portion.

7. The speed reducing or increasing apparatus according to claim 6, wherein a center of curvature of a partial spherical surface formed on an outer surface of the cage and a center of curvature of a partial spherical surface formed on an inner surface of the cage are offset to the left and right in the axial direction relative to the joint center of the ball spline portion.

8. The speed reducing or increasing apparatus according to claim 1, wherein a center of curvature of a partial spherical surface formed on an outer surface of the cage and a center of curvature of a partial spherical surface formed on an inner surface of the cage are offset to the left and right in the axial direction relative to the joint center of the ball spline portion.

9. A speed reducing or increasing apparatus that causes a first face gear to incline to mesh with a second face gear and causes the first face gear to oscillate to move a meshing portion in a circumferential direction, the speed reducing or increasing apparatus comprising:
a ball spline portion supporting the first face gear in an inclinable manner to transmit rotation of the first face gear to an output portion, the ball spline portion including
an outer ring comprising
an inner surface,
an outer surface having a diameter larger than a diameter of the inner surface of the outer ring, and
a ball groove formed in the inner surface of the outer ring of the ball spline portion,
an inner ring comprising a ball groove, and
a ball configured to roll along the ball groove of the outer ring and the ball groove of the inner ring; and
a bearing portion rotatably supporting the output portion, the bearing portion including
an outer ring having an inner surface in which a rolling element groove extending in the circumferential direction is formed,
an inner ring having an outer surface in which a rolling element groove extending in the circumferential direction is formed, the rolling element groove of the inner ring of the bearing portion being formed in the outer surface of the outer ring of the ball spline portion, and
a rolling element configured to roll along the rolling element groove of the outer ring and the rolling element groove of the inner ring,
wherein the outer ring of the ball spline portion is formed integrally with the inner ring of the bearing portion.

10. The speed reducing or increasing apparatus according to claim 9, wherein the output portion is formed integrally with the outer ring of the ball spline portion and the inner ring of the bearing portion.

11. The speed reducing or increasing apparatus according to claim 10, wherein the outer ring of the bearing portion is formed integrally with a flange having a through-hole for fastening the outer ring to a housing of the speed reducing apparatus.

12. The speed reducing or increasing apparatus according to claim 11, wherein
a tooth of the first face gear inclines in such a manner that an apex of a conic surface on which a tooth trace extends is closer in an axial direction to the bearing portion than a tooth surface of the first face gear, and
a tooth of the second face gear inclines in such a manner that an apex of a conic surface on which a tooth trace extends is closer in the axial direction to the bearing portion than a tooth surface of the second face gear.

13. The speed reducing or increasing apparatus according to claim 10, wherein
a tooth of the first face gear inclines in such a manner that an apex of a conic surface on which a tooth trace extends is closer in an axial direction to the bearing portion than a tooth surface of the first face gear, and
a tooth of the second face gear inclines in such a manner that an apex of a conic surface on which a tooth trace extends is closer in the axial direction to the bearing portion than a tooth surface of the second face gear.

14. The speed reducing or increasing apparatus according to claim 9, wherein the outer ring of the bearing portion is formed integrally with a flange having a through-hole configured to fasten the outer ring to a housing of the speed reducing apparatus.

15. The speed reducing or increasing apparatus according to claim 14, wherein a tooth of the first face gear inclines in such a manner that an apex of a conic surface on which a tooth trace extends is closer in an axial direction to the bearing portion than a tooth surface of the first face gear, and a tooth of the second face gear inclines in such a manner that an apex of a conic surface on which a tooth trace extends is closer in the axial direction to the bearing portion than a tooth surface of the second face gear.

16. The speed reducing or increasing apparatus according to claim 9, wherein a tooth of the first face gear inclines such that an apex of a conic surface on which a tooth trace extends is closer in an axial direction to the bearing portion than a tooth surface of the first face gear, and a tooth of the second face gear inclines such that an apex of a conic surface on which a tooth trace extends is closer in the axial direction to the bearing portion than a tooth surface of the second face gear.

17. A speed reducing or increasing apparatus that causes a first face gear to incline to mesh with a second face gear and causes the first face gear to oscillate to move a meshing portion in a circumferential direction, the speed reducing or increasing apparatus comprising:

a ball spline portion supporting the first face gear in an inclinable manner, the ball spline portion including
an outer ring comprising ball grooves,
an inner ring comprising ball grooves, the first face gear being formed integrally with the inner ring of the ball spline portion, and
balls capable of rolling along the ball grooves of the outer ring and the ball grooves of the inner ring, and a cage having pockets in which the balls are incorporated; and a notch portion that allows passage of a protrusion between the ball grooves of the inner ring is formed in the cage such that the inner ring is insertable into the cage in a state where an axis of the cage is aligned with an axis of the inner ring.

* * * * *